United States Patent [19]

Lipovski

[11] Patent Number: 6,148,034

[45] Date of Patent: Nov. 14, 2000

[54] APPARATUS AND METHOD FOR DETERMINING VIDEO ENCODING MOTION COMPENSATION VECTORS

[75] Inventor: G. Jack Lipovski, Austin, Tex.

[73] Assignee: Linden Technology Limited, Austin, Tex.

[21] Appl. No.: 09/090,487

[22] Filed: Jun. 4, 1998

Related U.S. Application Data

[63] Continuation of application No. 08/761,742, Dec. 5, 1996, abandoned.

[51] Int. Cl.[7] .................................................. H04N 7/36
[52] U.S. Cl. ..................... 375/240.16; 708/491; 708/703
[58] Field of Search ........................... 375/240; 348/407; 708/491, 703

[56] References Cited

U.S. PATENT DOCUMENTS

| | | | |
|---|---|---|---|
| 3,508,220 | 4/1970 | Stampler | 365/50 |
| 3,810,108 | 5/1974 | Krewson et al. | 365/125 |
| 3,997,882 | 12/1976 | Goyal | 365/49 |
| 4,065,756 | 12/1977 | Panigrahi | 365/49 |
| 4,172,282 | 10/1979 | Aichelmann et al. | 711/106 |
| 4,185,323 | 1/1980 | Johnson et al. | 365/222 |
| 4,232,376 | 11/1980 | Dion et al. | 365/222 |
| 4,277,838 | 7/1981 | Chambers | 365/222 |
| 4,450,520 | 5/1984 | Hollaar et al. | 710/65 |
| 4,507,748 | 3/1985 | Cotton | 708/518 |
| 4,590,465 | 5/1986 | Fuchs | 345/418 |
| 4,598,400 | 7/1986 | Hillis | 370/400 |
| 4,636,982 | 1/1987 | Takemae et al. | 365/149 |
| 4,646,306 | 2/1987 | Davis et al. | 714/801 |
| 4,677,592 | 6/1987 | Sakurai et al. | 365/222 |
| 4,701,879 | 10/1987 | Scarr | 365/49 |
| 4,706,221 | 11/1987 | Satoh et al. | 365/222 |
| 4,709,327 | 11/1987 | Hillis et al. | 712/14 |
| 4,710,935 | 12/1987 | Kim et al. | 714/801 |
| 4,716,552 | 12/1987 | Maltiel et al. | 365/222 |
| 4,718,041 | 1/1988 | Baglee et al. | 365/185 |
| 4,747,072 | 5/1988 | Robinson et al. | 711/101 |
| 4,748,439 | 5/1988 | Robinson et al. | 340/146.2 |
| 4,749,887 | 6/1988 | Sanwo et al. | 326/55 |
| 4,775,810 | 10/1988 | Suzuki et al. | 326/55 |
| 4,783,649 | 11/1988 | Fuchs et al. | 345/509 |
| 4,799,192 | 1/1989 | Wade et al. | 365/49 |
| 4,831,585 | 5/1989 | Wade et al. | 365/49 |
| 4,833,642 | 5/1989 | Ooi | 365/49 |
| 4,835,733 | 5/1989 | Powell | 711/218 |
| 4,931,994 | 6/1990 | Matsui et al. | 365/205 |
| 4,989,180 | 1/1991 | Lipovski | 365/189.07 |
| 5,184,325 | 2/1993 | Lipovski | 365/189.07 |
| 5,214,715 | 5/1993 | Carpenter | 382/157 |
| 5,285,411 | 2/1994 | McAulay | 365/49 |
| 5,363,476 | 11/1994 | Kurashige et al. | 345/425 |
| 5,412,763 | 5/1995 | Knoplioch et al. | 345/424 |
| 5,465,323 | 11/1995 | Mallet | 345/423 |
| 5,623,423 | 4/1997 | Lipovski | 708/703 |
| 5,892,632 | 4/1999 | Behrens | 708/491 |

OTHER PUBLICATIONS

Bush, "As We May Think," *Atlantic Monthly*, pp. 101–108 (Jul. 1947).

Lee, "Intercommunicating Cells, Basis for a Distributed Logic Computer," *Proc. FJCC*, pp. 130–136 (1962).

Lee et al., "A Content Addressable Distributed Logic Memory with Applications to Information Retrieval," *Proceedings of the IEEE*, vol. 51, pp. 924–932 (Jun. 1963).

(List continued on next page.)

*Primary Examiner*—Howard Britton
*Attorney, Agent, or Firm*—Cook, Alex, McFarron, Manzo, Cummings & Mehler, Ltd.

[57] ABSTRACT

An MPEG-1 or an MPEG-2 motion compensation vector encoder circuit achieves smaller circuit area, and hence lower cost, by using circuitry, including ROMs, designed to implement residue arithmetic to calculate sum squared error in a parallel pipelined fashion. A residue-to-binary converter is implemented using distributed arithmetic and a reduction circuit that removes powers of two times the modulus M, both of which use carry save arithmetic operators. An improved ROM-accumulator, used in the residue-to-binary converter, is implemented using carry-save addition within the ROM-accumulator, and ripple-carry or carry-lookahead addition on the output of the ROM-accumulator.

14 Claims, 9 Drawing Sheets

OTHER PUBLICATIONS

Crane et al., "Bulk Processing in Distributed Logic Memory," *IEEETC*, vol. EC–14, pp. 186–196 (Apr. 1965).

Slotnick, "Logic Per Track Devices," *Advances in Computers*, pp. 291–296 (1971).

Batcher, "The Flip Network in Staran," *Proc. 1976 Int. Conf. on Parallel Processing*, pp. 65–71 (Aug. 1976).

Lipovski, "Architectural Featues of CASSM: A Context Addressed Segment Sequential Memory," Proceedings of the $5^{th}$ ISCA, pp. 31–38 (Apr. 3–5, 1978).

Bray et al., "Data Base Computers," pp. 106–120 (D.C. Heath & Co. 1979).

Hollaar, "Text Retrieval Computers," *Computer*, vol. 12, No. 3, pp. 40–52 (1979).

Fuchs et al., "Developing Pixel–Planes, A Smart Memory–Based Raster Graphics System," 1982 Conference on Advanced Research in VLSI, pp. 371–380 (MIT Jan. 27, 1982).

"Graphics Interface '82," pp. 375–380 (1982, author and source unknown).

Clark, "The Geometry Engine: A VLSI Geometry System for Graphics," *Computer Graphics*, pp. 127–133 (vol. 16, No. 3, Jul. 1982).

IC Memories Data Book, pp. 356–363 (Hitachi Mar. 1987).

Hodges et al., "Semiconductor Memories," *Analysis and Design of Digital Integrated Circuits*, Sec. 9.3, pp. 372–380 (McGraw–Hill, $2^{nd}$ ed. 1988).

Lineback, "SEEQ's 512–KBIT Flash EEPROMs Support In–System Programming on 12–v Supply" (1988).

Akeley, et al., "High–Performance Polygon Rendering," *Computer Graphics*, pp. 239–246 (vol. 22, No. 4, Aug. 1988).

Deering, et al., "The Triangle Processor and Normal Vector Shader: A VLSI System for High Performance Graphics," *Computer Graphics*, pp. 21–30 (vol. 22, No. 4, Aug. 1988).

Gharachorloo et al., "Subnanosecond Pixel Rendering with Million Transistor Chips," *Computer Graphics*, pp. 41–49 (vol. 22, No. 4, Aug. 1, 1988).

Johnson, "Design and Analysis of Fault–Tolerant Digital Systems," pp. 63–65 (Addison–Wesley 1989).

Robinson, "Chameleon: A Pattern Matching Memory System," Technical Report HPL–SAL–89–24 (Hewlett Packard Co. Apr. 19, 1989).

Akeley, "Superworkstation, The Silicon Graphics 4D/240GTX Superworkstation," *IEEE Computer Graphics & Applications*, pp. 71–83 (Jul. 1989).

Fuchs, et al. "Pixel–Plantes 5: A Heterogeneous Multiprocessor Graphics System Using Processor–Enhanced Memories," *Computer Graphics*, pp. 79–88 (vol. 23, No. 3, Jul. 1989).

Grimes, "The Intel i860 64–Bit Processor: A General–Purpose CPU with 3D Graphics Capabilities," *IEEE Computer Graphics & Applications*, pp. 85–88 (Jul. 1989).

Potmesil et al., "The Pixel Machine: A Parallel Image Computer," *Computer Graphics*, pp. 69–78 (vol 23, No. 3, Jul. 1989).

Kirk, et al., "The Rendering Architecture of the DN10000VS," *Computer Graphics*, pp. 299–307 (vol. 24, No. 4, Aug. 1990).

Lipovski, G.J., "A Four Megabit Dynamic Systolic Associative Memory Chip,"Dept. of Elec. and Computer Engr., Univ. of Texas, Austin, Texas (Sept. 4, 1990).

Thompson, Karl Kelvin, "Ray Tracing with Amalgams," Dissertation, University of Texas at Austin (May 1991).

Loveria, "New 3D Graphics Engines Give PCS Workstation Power," *BYTE*, pp. 313–318 (Nov. 1991).

Molnar, et al., "Pixel Flow: High–Speed Rendering Using Image Composition," *Computer Graphics*, pp. 231–240 (vol. 26, No. 2, Jul. 1992).

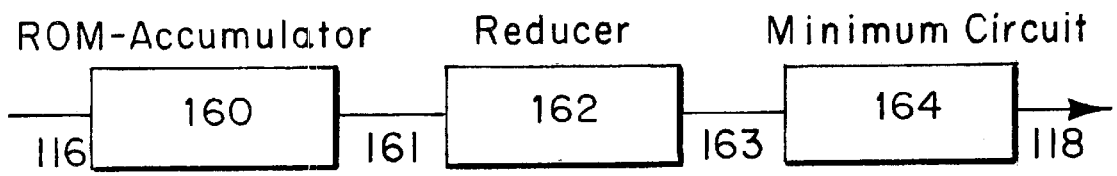
FIG. 9
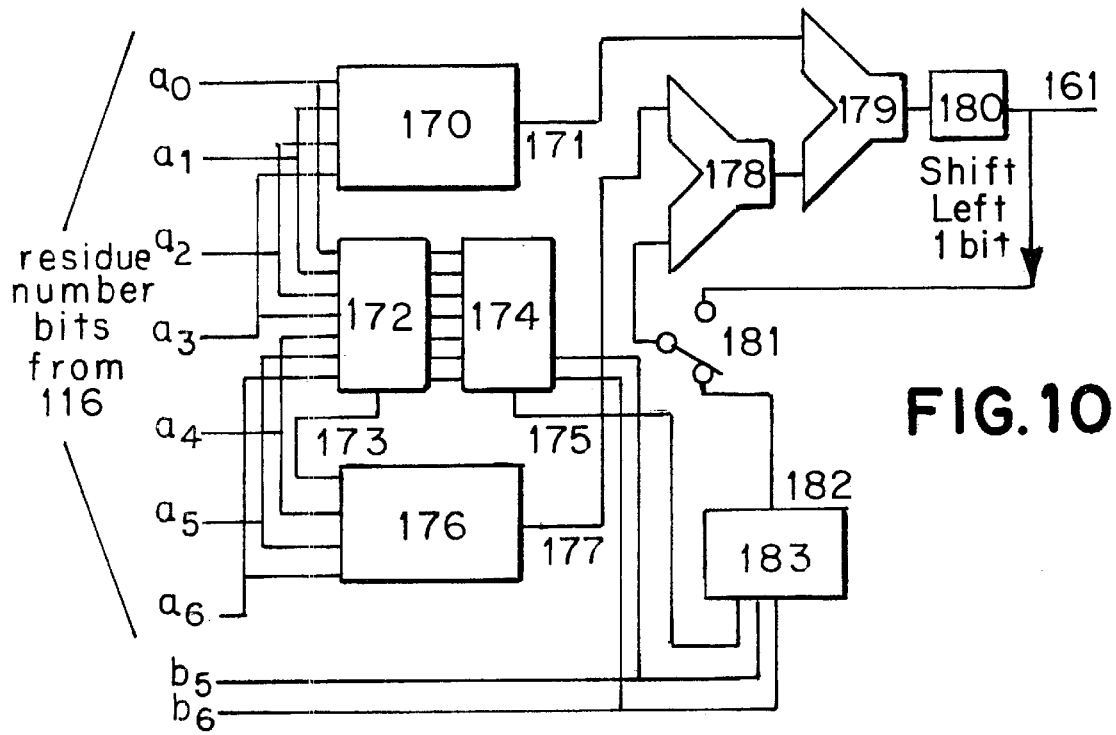
FIG. 10
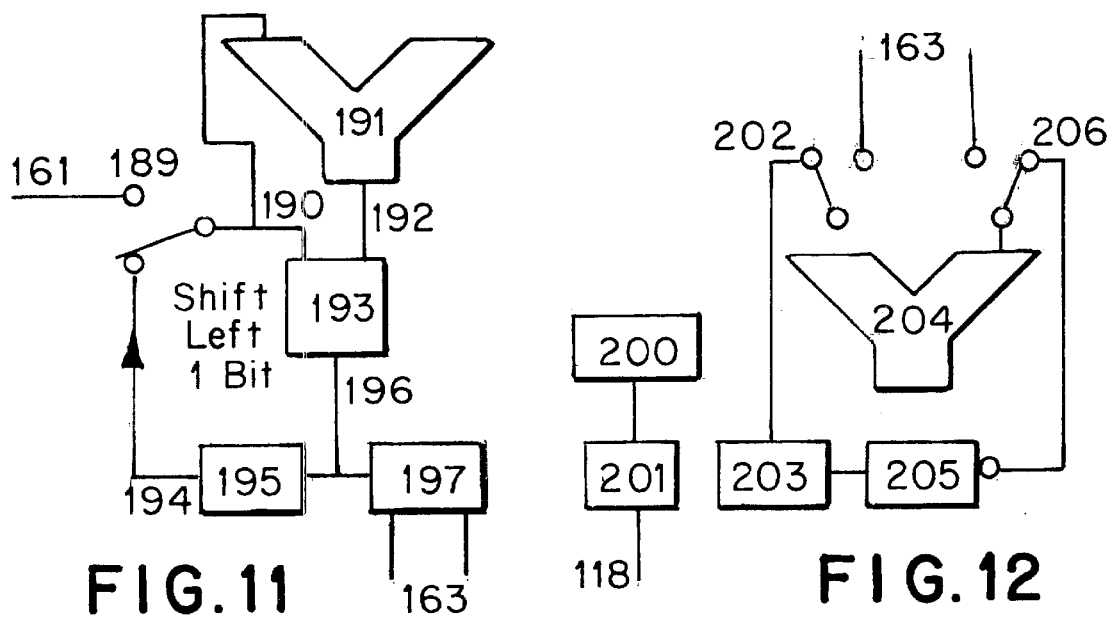
FIG. 11
FIG. 12

APPARATUS AND METHOD FOR DETERMINING VIDEO ENCODING MOTION COMPENSATION VECTORS

This appln. is a con of 08/761,742 Dec. 5, 1996, abandoned.

BACKGROUND OF THE INVENTION

This invention is in the field of compressed video signal encoders; it pertains to selecting a motion compensation vector by computing the Sum Squared Error, using residue arithmetic.

Video compression is a technique used to send or store digitized video more compactly, so that more "movies" can pass along the same communication channel or be stored in a particular storage medium.

The Motion Pictures Experts Group (MPEG) has defined International Organization for Standardization (ISO) standards for video and audio compression. MPEG-1 is a compression technique for compact disks, and it suited for hard disks. MPEG-2 is a similar compression technique for cable TV and for high definition TV (HDTV). The specific video protocols and specifications for MPEG-1 are defined in a three-part document published in 1993 by ISO and the International Electrotechnical Commission as an international standard, No. ISO/IEC DIS 11172-1, -2, and -3. The specific video protocols and specifications for MPEG-2 are defined in a three-part document published in 1994 by ISO and the International Electrotechnical Commission as a draft international standard, No. ISO/IEC DIS 13818-1,-2, and -3.

However, the terms MPEG-1 and -2 really define only the compressed bitstream—as it is stored or sent, as a communications protocol. Special cases of each fully define the computational effort needed in encoding and decoding these signals by specifying the screen sizes and other parameters. For one special case of MPEG-1, known by the acronym, SIF/CPB, the video's display dimensions are 352 by 240, about half the width and height of a TV screen. MPEG-1 SIF/CPB is currently an established compression technique as large numbers of CD-ROMs are being developed for personal computer multimedia systems. For a special case of MPEG-2, known as main level, the video's display dimensions are 720 by 480, about the width and height of a TV screen. Digital satellite T.V. uses MPEG-2 main level compression technique. For another special case of MPEG-2, known as high level, the video's display dimensions are 1920 by 1080 pixels, a little over twice the height and twice the width of a conventional TV screen. HDTV is expected to use the high level, MPEG-2 compression technique.

In any system meeting MPEG ISO standards, an encoder 102 (see FIG. 1) converts normal video 100 to compressed video and converts normal audio 101 to compressed audio. The combined and compressed signal is sent over a communication channel or stored in a storage medium, either of which is identified in FIG. 1 as data stream 104. Decoder 105 recovers normal video 107 from compressed video data and normal audio 108 from compressed audio data. The invention consists of a circuit that can operate on video signals as part of encoder 102.

The encoder 102 inputs video data from input 100, compresses this data by performing certain operations described below, and sends compressed data in stream 104 (see FIG. 2). A "block" is an 8 by 8 array of adjacent pixels. Video data from input 100 is processed block-by-block. For each input block the encoder 102 actually sends a difference block determined by motion compensation encoding.

For motion compensation encoding, previously sent video data is stored in a memory 103 by the encoder 102 and also in a memory 106 by the decoder 105. The difference block 120 is created in a motion compensation transform encoder 119, pixel-by-pixel, by subtracting from the pixel value of the block of input data 100 the corresponding pixel value of some previously sent reference block read from memory 103. The reference block is identified by motion compensation vector 118, which is a pair of numbers, a horizontal offset and a vertical offset, giving the relative screen offset from each pixel in the input block to the corresponding pixel in the reference block.

In the encoder 102 this difference block 120 is discrete cosine transformed 121 to convert space-domain data to frequency-domain data 122, and is Huffman encoded 123, to send the more common patterns using shorter code words. The encoded video data including the motion compensation vector is sent to the decoder in stream 104. The decoder 105 Huffman decodes the input data from data stream 104, discrete cosine transforms it, to convert frequency-domain data back to space-domain data to recreate the difference block.

Then in the decoder 105, motion compensation decoding adds, pixel-by-pixel, the pixels of the difference block to previously sent pixels stored in 106, which are selected by the motion compensation vector sent through stream 104, to obtain a block of video data to be outputted 107.

In an MPEG motion compensation encoder, theoretically all blocks of previously sent video data should be tested to obtain the motion compensation vector that reduces data rate in the stream 104 to a minimum. Simplistically, a block should be selected that is where the object appeared last, due to motion, because the difference to be sent should be a block of zeros. This motion compensation vector is conceptually an indication of the movement or motion of the input block. However, the motion compensation vector may select a reference block that just happens to result in a lower data rate in data stream 104 by some accident unrelated to the motion of the block of pixels. The motion compensation coding problem really just involves testing previously sent blocks of pixel data to see which previously sent block happens to give the lowest data rate in data stream 104. However, for MPEG-1 SIF/CPB having 352 by 240 pixels, the (352/8=44) by (240/8=30) blocks would each have to be compared to (352–8) by (240–8) test blocks, requiring 44·30·340·232 tests each 1/30 of a second. These >1030 tests per second are beyond the capabilities of a practical low-cost system. Rather, in this preferred embodiment, motion compensation vectors for test blocks are restricted within a range +7 to −8 pixels in the horizontal and vertical direction. The selection of a block should be based on the size of the resulting bit pattern actually generated in stream 104. Rather than completing this encoding of the block, the mean squared error (actually the sum squared error, which is monotonic with mean squared error) of the current block and tested block is computed because the test block with least mean squared error generally produces a small amount of Huffman encoded data to be sent over the stream 104.

To accomplish motion compensation encoding in 102, for each block of input data copied into static RAM 111, a reference block is selected, and its motion compensation vector determined, by testing a large number of blocks of previously sent video data, which have been copied into static RAM 110, against the block of input data. In each test, a test block of previously send video data is selected by addressing SRAM 110 and by controlling barrel switch 112. In the sum squared error circuit 115, each pixel of the block of input data 100 is subtracted from the corresponding pixel of the selected test block, and the difference is squared. The sum of these squares is outputted as the sum squared error 116 of the input block and the test block. Minimum circuit 117 obtains the least sum squared error for each test block and the motion compensation vector 118 thereof.

Integrated circuits implementing MPEG-1 SIF/CPB encoders have been announced at this time, but are very expensive. No integrated circuit implementing high level MPEG-2 has been announced at this time. As with any integrated circuit, the circuit area impacts the cost of the circuit dramatically, and the feasibility of implementing larger circuits. In view of the foregoing, there is a continuing desire in the art for an integrated circuit that can operate as an MPEG encoder that can use less circuit area, and consequently achieve a lower manufacturing cost, than known implementations.

The main problem in encoding an MPEG-1 or MPEG-2 video signal is in determining the motion compensation vector by calculation of a sum squared error. It is an object of the invention to create a circuit in the video encoding circuitry that can efficiently perform a sum squared error calculation, to implement the MPEG-1 or MPEG-2 encoding without undue circuit sizes.

It is another object of the invention to create a sum squared error calculation circuit in a video encoder circuit that operates using residue arithmetic.

It is another object of the invention to implement an efficient residue-to-binary converter.

SUMMARY OF THE INVENTION

The inventive device achieves the object of computing the sum squared error of the input block and a previously sent test block, for a large number of test blocks, selecting the test block with the least sum squared error, and outputting its motion compensation vector. It uses residue arithmetic, a highly specialized type of arithmetic that has been used in military signal-processing.

The input block's 64 pixel values are converted in 109 from binary to residue format and stored in SRAM 111 as residue numbers. Nine of the previous frame's blocks, which are displayed on the screen on and adjacent to the input block, are input from bulk (DRAM) memory 103 and are stored in SRAM 110 in binary number representation. In conjunction with SRAM 110 addressing, a barrel switch 112 extracts the test block from these nine blocks.

A sum squared error calculation takes 8·8=64 binary-to-residue conversion, subtract, square, and addition operations. Eight such operation are simultaneously executed in parallel pipelines—in particular the eight conversions from binary to residue, subtractions, and squaring operations, for elements in a column of an input block in SRAM 111. Eight such successive operations are computed sequentially to handle all the columns of the input block in SRAM 111. A tree of modules, whose leaves are pixel modules and whose non-leaf nodes are adders, and an extra adder with register, accumulates the sum squared error in the register. In 115, the binary-to-residue conversion, subtract, and square operations are performed in each of the eight parallel pipelines using residue arithmetic, and addition is performed in the tree of adders using residue arithmetic. After eight accumulation steps, the sum squared error 116 is inputted to a residue-to-binary converter and minimum circuit 117. When a minimum is found, it is saved in a register, and an incrementing count is also saved in a register to indicate which step, and therefore which motion compensation vector, produced the minimum. This motion compensation vector 118 is outputted to be used to obtain the difference block 120 which is outputted from MCT encoder 119.

One disadvantage of using residue numbers is that they have to be converted to and from binary numbers. However, the inventive system also incorporates an efficient residue-to-binary converter. This inventive converter uses distributed arithmetic to multiply residues by their weights, and it uses carry-save arithmetic processing elements to speed up this calculation and to minimize chip area. In distributed arithmetic, ROMs and the accumulators in which the shifting and adding takes place comprise units called RACS, and each RAC stores the constants representing residue number weights. This inventive converter also uses an iterative circuit to remove multiples of the modulus from the resulting binary number.

The use of residue arithmetic has been limited to a few applications in military signal processing, and has not been successful in other commercial applications. While this would discourage most artisans from using the inventive system, it will be shown that the inventive residue arithmetic/ROM table-lookup implementation of the encoder results in a circuit that achieves the principal objects of the invention. An MPEG-1 encoder in accordance with the invention can have a chip size that is smaller than currently implemented MPEG-1 encoders by a large factor. Contemporary MPEG-1 encoders equivalent to the inventive system are expected to take a chip area roughly comparable to a whole 16 Mbit DRAM. The inventive system disclosed here, by contrast, can be implemented for SIF/CPB MPEG-1 with about 130 K bits of 8 nsec. ROM and it can be implemented for main level MPEG-2 with about 2 M bits of 3.5 nsec. ROM. The faster ROMs recommended in the invention takes somewhat larger area than a conventional DRAM bit, say 1.5 to 3 times greater, and each SRAM bit will take an area of about four DRAM bits. Nevertheless, the inventive system can be implemented for SIF/CPB MPEG-1 in about 2% of a 16 Mbit DRAM's chip area, which is smaller than the smallest of the known alternatives. Using this inventive circuit, one could possibly build an MPEG-2 high level encoder on a single chip.

Thus, the inventive system allows for dramatic reduction in size, which translates into dramatic reduction in the cost of a very important chip.

Other aspects of the invention will be appreciated by those skilled in the art after reviewing the following detailed description of the invention.

BRIEF DESCRIPTION OF THE DRAWINGS

The novel features of the invention are described with particularity in the claims. The invention, together with its objects and advantages, will be better understood after referring to the following description and the accompanying figures, in which common numerals are intended to refer to common elements.

FIG. 9 is a diagram illustrating the organization of a residue to binary number converter.

FIG. 10 is a block diagram showing the ROM-accumulator, the first stage of FIG. 9.

FIG. 11 is a block diagram showing the reducer, the second stage of FIG. 9.

FIG. 12 is a block diagram showing the minimum circuit stage, the third stage of FIG. 9.

DETAILED DESCRIPTION OF THE PREFERRED EMBODIMENT

Figure 1:
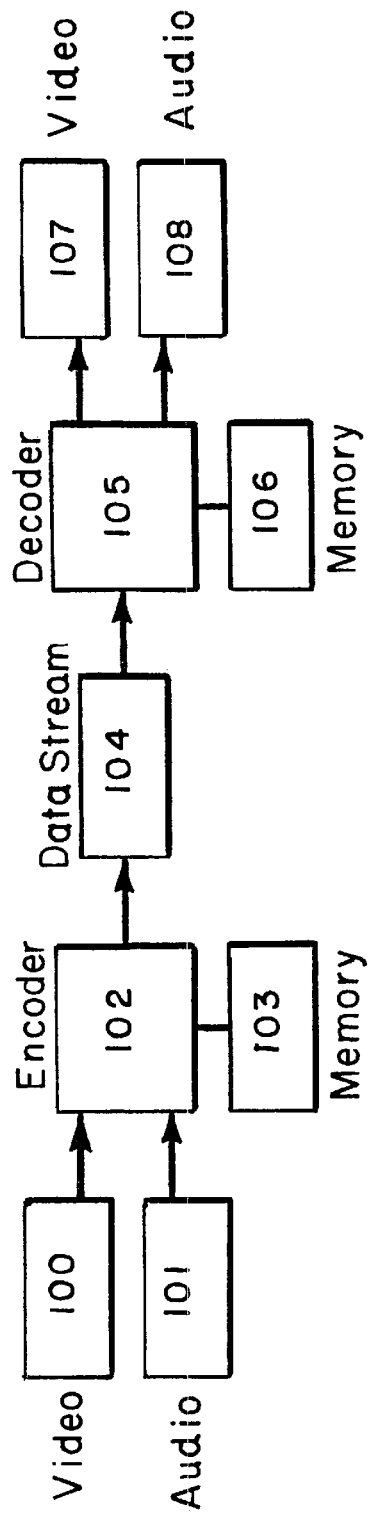
FIG. 1 is a description of the overall signal paths used in the encoding and decoding of compressed video and audio data.
Figure 2:
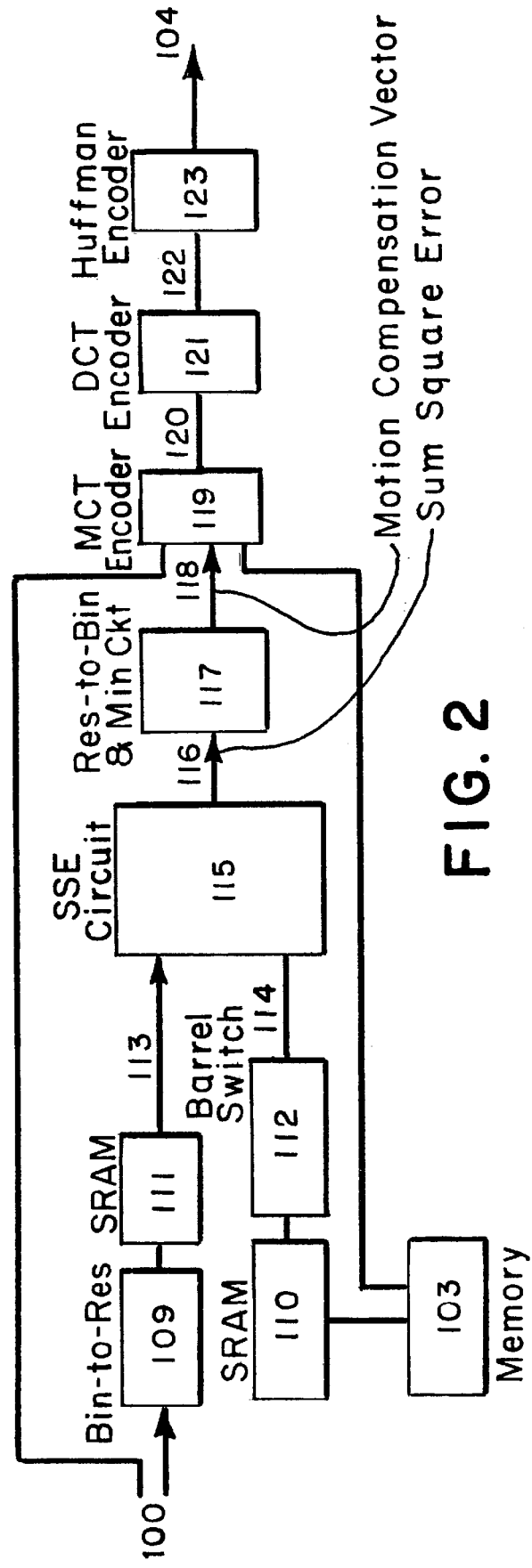
FIG. 2 is a block diagram of a video portion of an MPEG-2 encoder.

1. Residue Arithmetic.

As described in §2 below, residue or modulus arithmetic significantly reduces the size of the sum squared error circuit, compared to using binary arithmetic. This section provides some background in residue arithmetic. Further details of residue arithmetic is provided in Chapter 2, "Residue Numbers and the Limits of Fast Arithmetic," which is at pages 53–76 of the textbook by Waser et al, entitled "Introduction to Arithmetic for Digital Systems Designers" (Holt Rinehart & Winston 1982).

Residue arithmetic is defined by a set of k relatively prime moduli $(m_0, m_1, \ldots, m_{k-1})$. An integer n is represented in residue arithmetic as a k-tuple $(v_0, v_1, v_{k-1})$ where each member of the k-tuple $(v_i)$ is the remainder of the integer (n) divided by the associated modulus $(m_i)$.

In the commonly used computer programming language called "C," the remainder of n divided by m, using integer division, is denoted as n % m. For example, 4% 2 is the remainder after dividing 4 by 2, which is 0. In this description, the C-language terminology will be followed.

Moduli must be relatively prime. For the following illustration of residue arithmetic, assume the use of the moduli 2, 3, 5. In that example, the ordinary number 4, calculated by 4% 2, 4% 3, 4% 5, is represented as (0, 1, 4), and the number 6 is 6% 2, 6% 3, 6% 5, or (0, 0, 1).

For unsigned numbers, any number less than the product of all of the moduli M can be uniquely represented in the moduli number system, and for signed numbers, any number between M/2−1 and −M/2 can be represented, by representing negative numbers n as M+n.

In residue arithmetic, addition and multiplication are performed on each element separately, without carries between, or shifts of, elements. In general, if the number n is represented by $(u_0, u_1, \ldots, u_{k-1})$ and the number m is represented by $(v_0, v_1, \ldots v_{k-1})$ then the sum n plus m is calculated as $((u_0+v_0) \% m_0, (u_1+v_1) \% m_1, \ldots, (u_{k-1}+v_{k-1}) \% m_{k-1})$. For instance, in the example above, recall that 4 is (0, 1, 4) and 6 is (0, 0, 1). Thus, 4 plus 6 will be ((0+0) % 2, (1+0) % 3, (4+1) % 5) or (0, 1, 0). Note that 10 is (10% 2, 10% 3, 10% 5), or (0, 1, 0), too.

Products are similarly simple, The generalized product n·m is $((u_0 \cdot v_0) \% m_0, (u_1 \cdot v_1) \% m_1, \ldots, (U_{k-1} \cdot V_{k-1}) \% M_{k-1})$. For instance, 4 times 6 is calculated by ((0·0) % 2, (1·0) % 3, (4·1) % 5) or (0, 0, 4). Note that 24 (the product of 4 and 6) is (24% 2, 24% 3, 24% 5), which is also (0, 0, 4).

Using the assumed set of moduli, if the numbers are unsigned, any number less than 2·3·5=30 may be represented, and if signed, then numbers from −15 to +14 can be represented.

Figure 3:
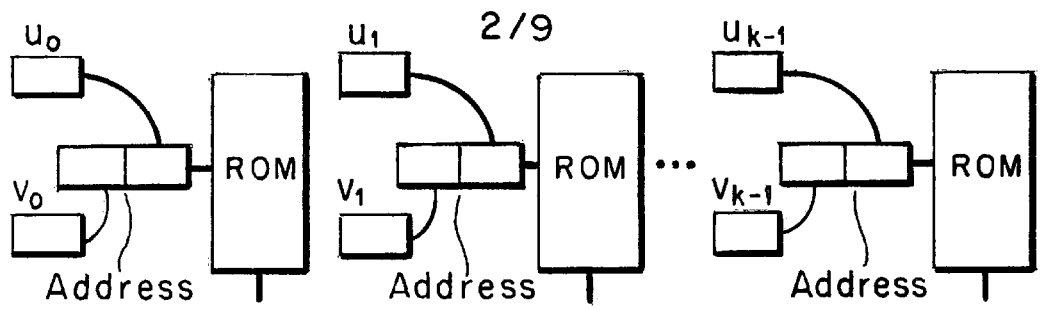
FIG. 3 is an illustration of ROM table look-up for residue number addition or multiplication.

An advantage of residue arithmetic is that, with the use of small moduli $m_k$, addition and multiplication can be implemented using small-sized ROMs. FIG. 3 shows an arrangement of elements, which clarifies that an adder/multiplier can be implemented with k modules containing two registers and a small ROM. To add n+m, using the general terminology above, in the left subsystem of FIG. 3 we concatenate $u_0$ and $v_0$ to create an address a and read out the ath row of the left ROM. This ROM has been written such that its ath row contains the number $(u_0+v_0) \% m_0$. The operation is repeated for $(u_1, v_1)$ through $(U_{k-1}, V_{k-2})$, for each of the other ROMs, which operations can proceed in parallel.

Multiplication is implemented similarly, using k ROMs filled with data such that the ath row of the ith ROM contains $(u_{i-1} \cdot v_{i-1}) \% m_{i-1}$, where a is $u_{i-1}$ concatenated with $v_{i-1}$. Note that the left-most subsystem's ROM has $m_0$ squared rows and $[\log_2 m_0]$ bits in each row, the next left-most subsystem's ROM has $m_1$ squared rows and $[\log_2 m_1]$ bits in each row, and so on, (where the expression "[xyz]" refers to the least integer equal to or above the expression xyz). For the case of residue arithmetic using 2, 3, 5 moduli, the left-most ROM has four rows of one bit, the middle ROM has nine rows of two bits, and the right ROM has 25 rows of three bits.

Note that addition does not need carry propagation and multiplication does not need shifting. Both operations execute completely in a single ROM access time. That represents a significant advantage of using residue arithmetic.

Residue number arithmetic also requires conversion to and from the conventional binary number system. Conversion from binary to residue may be simply executed with a table-lookup using a ROM, as shown on the left of FIG. 4. The binary number value provides the row address, and the cells across the row store the residues. (A more efficient technique is later demonstrated.)

Conversion from residue to binary is done with an adder pipeline. (See the Waser textbook.) If the number n is expressed in residue form as $(u_0, u_1, \ldots, u_{k-1})$, the binary number representation of n is obtained by evaluating the expression:

$$n = (\Sigma^{k-1}_{i=0} w_i \cdot u_i) \% M \quad (1)$$

where (i) the multiplication, addition, and modulus operations are executed in regular binary arithmetic, (ii) $w_i$ are a series of weights, and (iii) where M is the product of all of the moduli $(m_0, m_1, \ldots, m_{k-1})$. Each weight $w_i$ (associated with modulus $m_i$) is calculated by looking for the integral multiple of $(M/m_i)$ that is represented as a residue number that has all '0's except a single '1' in the ith place from the left. An algorithmic expression of determining the weight $w_i$ for a particular modulus $m_i$ is as follows: (i) Let the variable j increment in unit steps, that is, 1, 2, 3, . . . , $m_{i-1}$; (ii) for each step, compute the expression J=((j·M/$m_i$)) % M); (iii) convert the result to residue form; (iv) examine the residue form to see if it has all zeros and a one in the ith place; and (v) if so, then j is the weight $w_i$ and the process can be terminated. The weights $w_i$ are calculated in advance for a particular set of moduli, which is sufficient for hardware implementations of a residue-to-binary converter.

Figure 4:
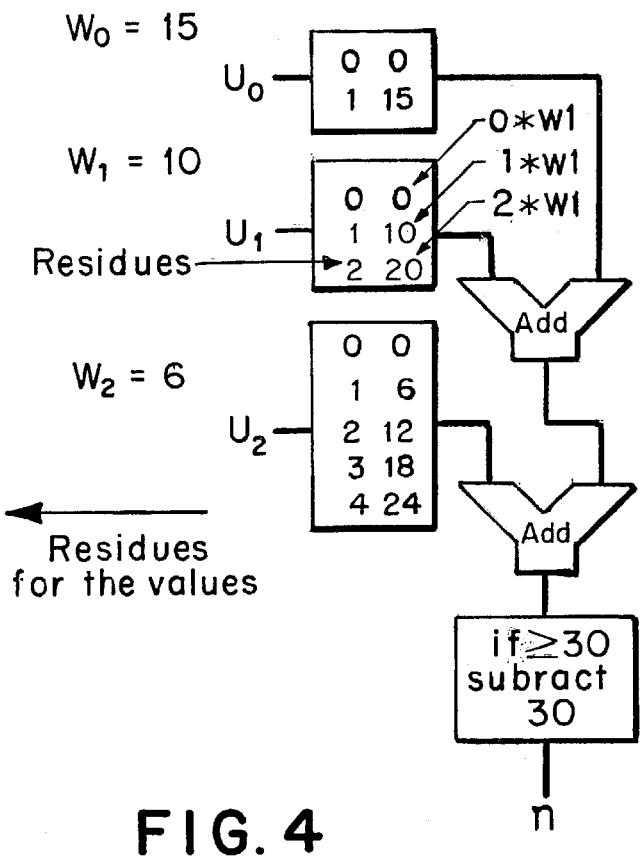
FIG. 4 is an illustration of ROM table look-up for residue number conversion to or from binary.

The hardware for conversion from residue to binary, shown on the right of FIG. 4, uses a ROM having mi rows to multiply $w_i \cdot u_i$ in binary, by storing $(w_i \cdot u_i)$ % M in the ROM's $u_i$th row, and k-1 binary adders to compute the above-described sum (n). The final value n % M is computed in a pipeline implementing the following iterative formula. For $r=[\log_2(h-1)], \ldots, 0$: if $n>(M \cdot 2^r)$, subtract $(M \cdot 2^r)$ from n. (A more efficient technique is later demonstrated.)

Residue arithmetic is not useful if the algorithm has division or comparison; it is only useful for addition, subtraction and multiplication. Sum squared error uses only these operations. Moreover, residue arithmetic multiplication is integer, rather than fractional multiplication, and residue numbers are very hard to scale, so the value of the product of the modulae, $M=\Pi^{k-1}_{i=0} m_i$ must be larger than the range of the largest possible integer result. Inputs to the sum squared error circuit are eight-bit values between 0 and 255, and the difference of such numbers squared, gives a 18-bit number. Up to 64 of these are added, requiring 6 bits to handle overflow. These operations produce a 24-bit result R which is less than 16,777,216. This precision is achievable using modulae $m_0=5$, $m_1=7$, $m_2=9$, $m_3=11$, $m_4=16$, $m_5=17$, and $m_6=19$ (their product M being 17,907,120), and M is greater than R. This residue number memory-bus width is 28 bits.

2. Sum Squared Error Circuit and its Input.

Figure 5:
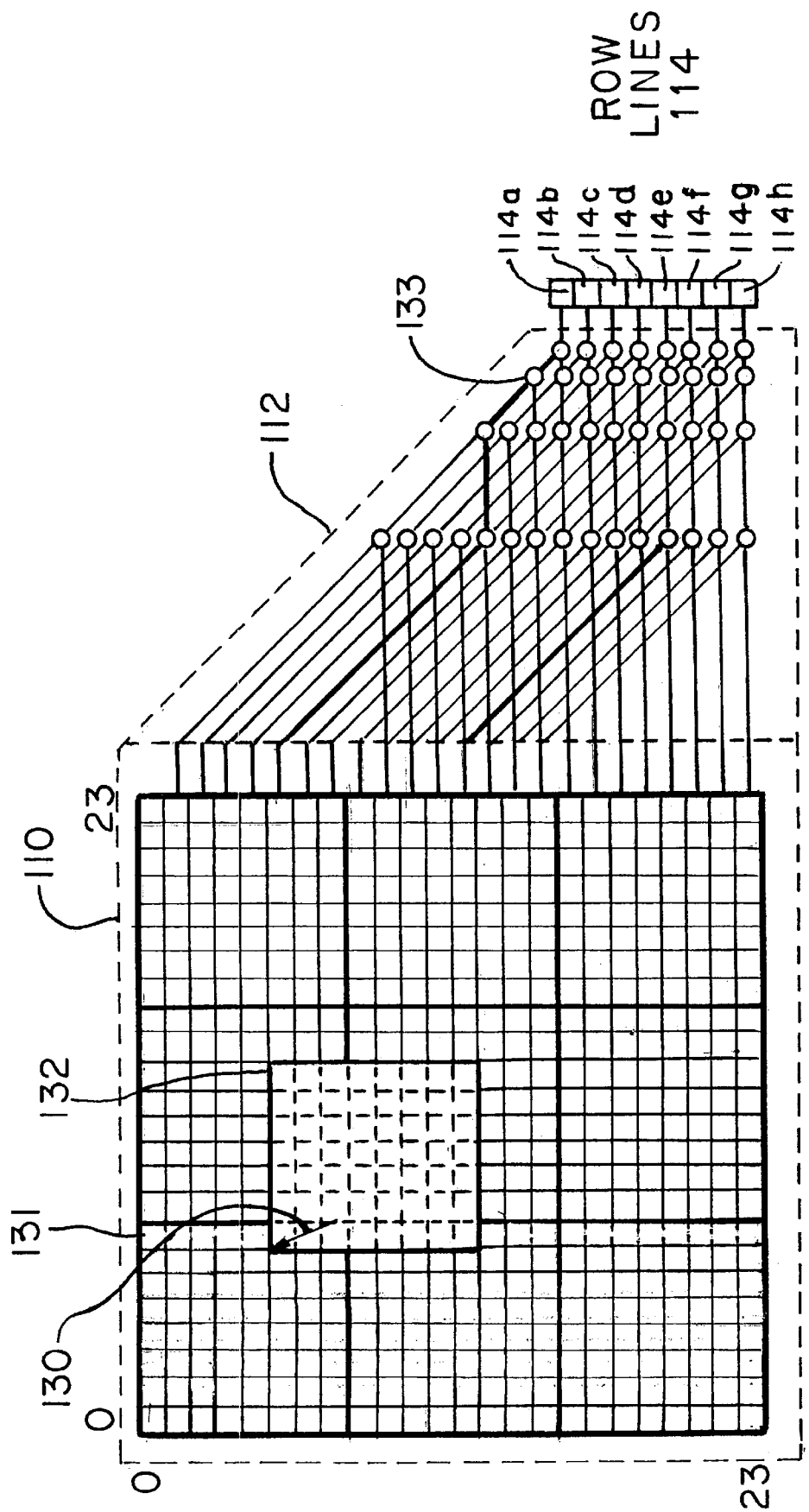
FIG. 5 is an illustration of selection of a test block for sum squared error calculation.

SRAM 110 and barrel switch 112 feed the sum squared error module with columns of the test block. On the left of FIG. 5, the thick-lined squares represent SRAM storage for 8 by 8 blocks and the smallest squares each represent 8-bit pixels. Of the nine blocks, the center block is a past frame's block in the same position on the screen as the input block currently in SRAM 111. Eight neighboring thick lined blocks are shown around it. At any given time, a motion compensation vector describes which test block is being compared to the input block in SRAM 111 being encoded. For motion compensation vector (−1, −3) represented by arrow 130, the block of pixels 132 is the test block being compared to the input block in SRAM 111.

The video data's input blocks are encoded from left to right on the screen first, and then from top to bottom. For each input block in SRAM 111, the motion compensation vectors (i, j) are tried sequentially by varying rows i first, from −8 to +7, and then next varying the columns j, in the sequence −8, 0, −7, 1, −6, 2, ..., −1, +7. A column of pixel values is read from the SRAM 110. For instance the whole 24-byte column, 131, is read, containing within it the test block's left column. These values are passed through barrel switch 112 to permute data from this column so that the previous frame's rows line up with the corresponding input block in SRAM 111 rows in an input 114a to a pixel module 140a, input 114b to a pixel module 140b, and so on. On the right of FIG. 5, each line is a byte-wide bus, and the 43 circles, 133, are single-pole-double-throw 8-bit wide switches. The switches are configured as a function of the row number of the bottom of the test block relative to the bottom row of the 9-blocks stored in SRAM. In this example having bottom row 12, the number is 23−12=11 (binary 1011). First the test block's left column is input to the sum squared error module by configuring the barrel's first, second and fourth from the right switches up and the others down, corresponding to bits 1, 1, 0, and 1, as is shown by the thick lines through the barrel tracing the top and bottom pixels' path. Following the first input, the test block's other seven columns are sequentially input along the path selected for the first column.

As motion compensation vectors (i, j) are tried, after each column is just read for the last time, SRAM 110 can be filled with data from DRAM 103 every other 4 nsec. while data are fed to the barrel switch 112 and sum squared error circuit 115 every other 4 nsec. in time-multiplexed mode. Since the motion compensation vectors (i, j) are tried in the sequence j=−8, 0, −7, 1, ..., +7, while a column is filled with 24 pixel values, the sum squared errors of 32 test blocks are calculated. After all motion compensation vectors for the input block in SRAM 111's block are tried, to try the motion compensation vectors for the next input block written into in SRAM 111, the SRAM's column decoder re-addresses the blocks in 112 so that effectively the past frame's block, in the same screen position as the new input block in SRAM 111 being encoded, but already in SRAM for the previous input block tests, becomes the past frame's block in the center of FIG. 5.

Figure 6:
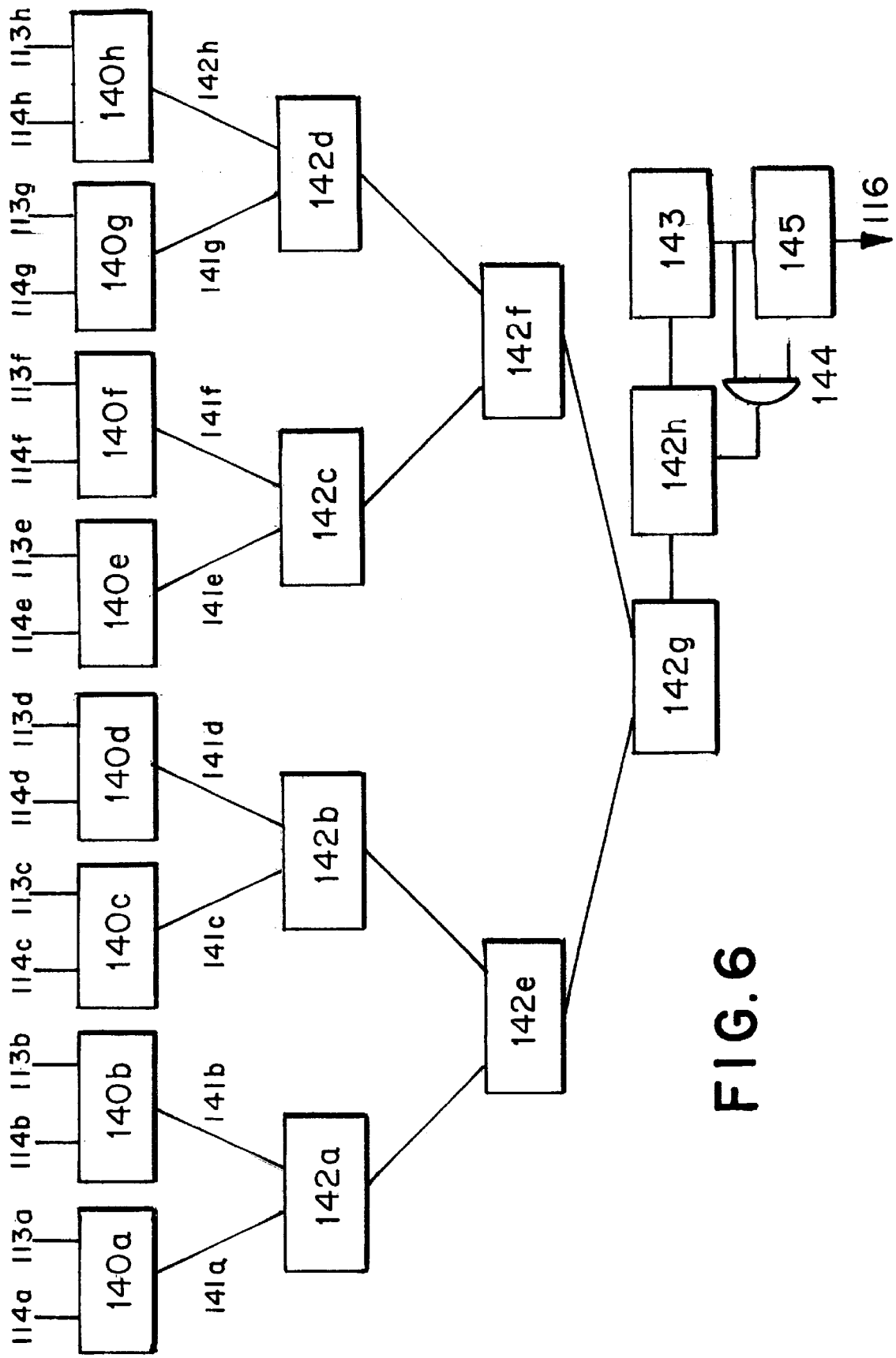
FIG. 6 is a diagram for sum squared error calculation circuitry.

Sum squared error circuit comprises eight pixel modules 140a, 140b, ..., 140h on the top of FIG. 6, a tree of eight adders 142a, 142b, ..., 142h on the bottom, and register 143 on the bottom right. Each pixel module, 141a, 141b, ..., 141h, computes the square of the difference of pixel values of the input block and the test block. The tree of adders 141a, 141b, ..., 141h adds the results into register 143.

Figure 7:
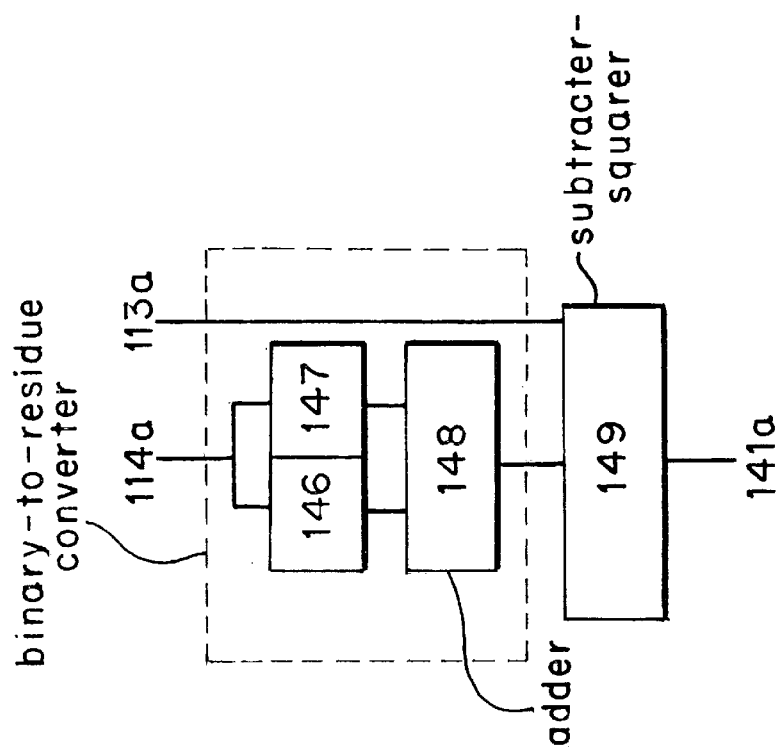
FIG. 7 is a diagram for a pixel module used in sum squared error calculation circuitry.

Pixel module 140a, shown in FIG. 7, has binary-to-residue converter and subtracter-squarer 149. Other pixel modules 140b to 140h are identical to 140a shown in FIG. 7. An 8-bit binary-to-residue converter comprises two four-bit binary-to-residue converters 146 and 147, each being a 16 by 28 bit ROM. ROM 146 converts the input's low four bits and ROM 147 converts the high four bits into residue numbers, Adder 148 combines these results. Such an 8-bit binary-to-residue converter is in each pixel module 140a, 140b, ..., 140h, and also is in 109.

Figure 8:
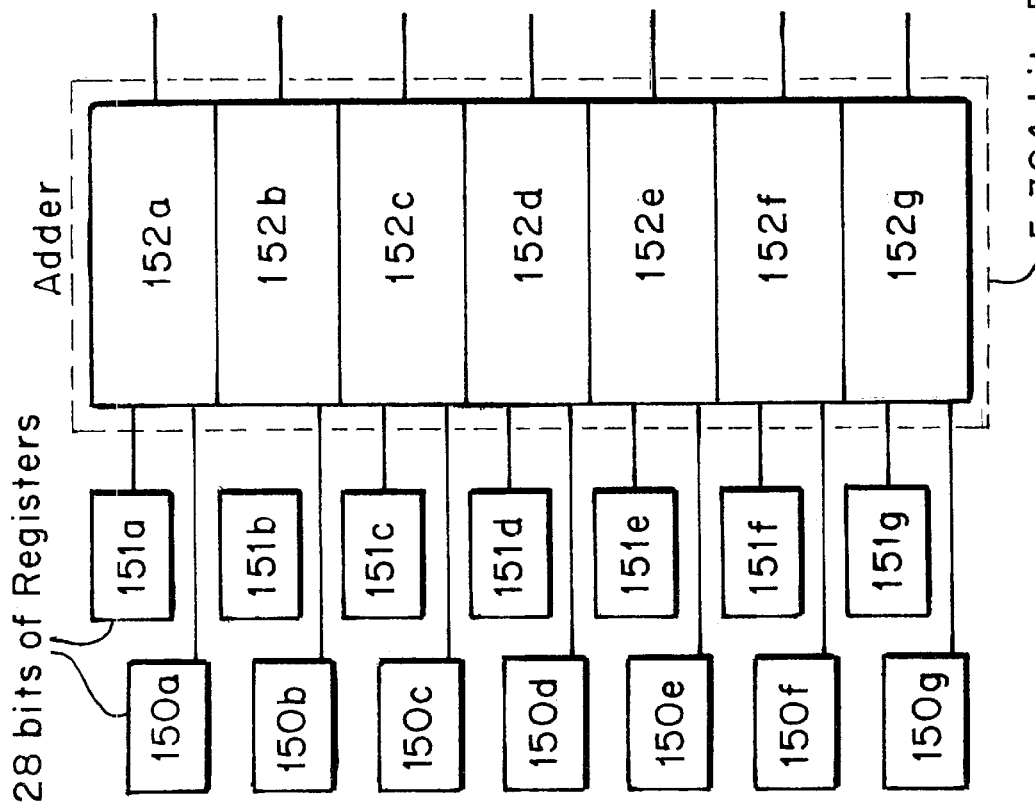
FIG. 8 is a diagram illustrating the organization of the adder or of the subtracter-squarer.

Each of the adders 142a, 142b, ..., 142h and each adder 148 in pixel modules 140a, 140b, ..., 140h is implemented as shown in FIG. 8, with input registers 150 and 151, and ROMs 152. The ith subcomponent comprising 150i, 151i, and 152i handles one residue. For example, register 150a holds the modulo 5 residue of one number $u_a$, register 151a holds the modulo 5 residue input of another number $v_a$, and ROM 152a has stored in row $u_a$, $v_a$ the sum $(u_a+v_a)$ % 5 as described in § 1. A subtracter followed by square function can be realized in one ROM the same size as the adder, but with different contents. So FIG. 8 also describes this subtracter-squarer 149, but for the ith module, ROM 152i is written with $(((u_s-v_i) \% m_i)^2) \% m_i$. For example, register 150a holds the modulo 5 residue of one number $u_a$, register 151a holds the modulo 5 residue of another number $v_a$, and ROM 152a has stored in row $u_a$, $v_a$ the sum $(((u_a-v_a) \% 5)^2)$ % 5. Curiously, the square function, a real problem in most other technologies, is "free" in this invention because it can be built into the same ROM that implements subtraction.

When the sum squared error of the first column is being outputted from adder 142g, AND gate 144 outputs zero, otherwise it outputs register 143's value. After eight clock steps, register 143 contains the sum squared error of the input and test blocks; at this time this sum squared error is clocked into register 145, which is outputted as 116.

Each adder uses 5,304 bits of ROM. The 24 adder or subtracter/squarer ROMs take about 127 K bits; they occupy most of the chip area for computing the motion compensation vector.

3. Residue to Binary Converter and Minimum Circuit.

After the sum squared error circuit, the residues $U=u_6$, $u_5$, $u_4$, $u_3$, $u_2$, $u_1$, and $u_0$ are input at 116 and pass through a three-stage pipeline (FIG. 9) having a ROM-accumulator 160, reducer 162, and minimum circuit stage 164, to output a motion compensation vector at 118. The first stage, a ROM-accumulator, uses distributed arithmetic to obtain the binary number value 161 of $U+(k \cdot M)$, for some $k<16$, in the sum-and-carry format that is used in carry-save addition. The residues are inputted to the accumulator most significant bits first. The design and operation of accumulator 160 is described by first showing the operation of the least significant bits in the last step, then the operation for a typical set of bits, and finally a special operation for the most significant bits used only in the first step.

In the last step, the least significant bits of four residues, $u_3$, $u_2$, $u_1$, and $u_0$, form the address ($a_3$ $a_2$ $a_1$ $a_0$), with $a_0$ from $u_0$ as the least significant bit and $a_3$ from $u_3$ as the most significant bit, of ROM 170 that outputs a value 171. See FIG. 10. In ROM 170, each row stores the inner product of its binary address and the weight vector, as discussed in §1, which is expressed as $\Sigma^3_{i=0} a_i \cdot w_i$. Row 0 stores 0, row 1 stores $w_0$, row 2 stores $w_i$, row 3 stores $w_i+w_0$, row 4 stores $w_2$, row 5 stores $w_2+w_0$, row 6 stores $w_2+w_i$, row 7 stores $w_2+w_i+w_0$, row 8 stores $w_3$, row 9 stores $w_3+w_0$, row 10 stores $w_3+w_1$, row 11 stores $2_3+w_1+w_0$, row 12 stores $w_3+w_2$, row 13 stores $w_3+w_2+w_0$, row 14 stores $w_3+w_2+w_1$, and row 15 stores $w_3+w_2+w_1+w_0$. In each case however, if n, the number stored, is greater than the product of the moduli M, n % M is stored in the ROM 170, because in the reduction stage 162, M will be subtracted as many times as possible. An overflow signal 173 described below, and the least significant bits of three residues, $u_6$, $u_5$, and $u_4$, form respective bits of the address (v $a_6 a_5 a_4$) inputted to ROM 176 that outputs a value 177. The first eight rows of this ROM also stores the inner product $\Sigma^6_{i=4} a_i \cdot w_i$ in the same manner as in ROM 170, but the last 8 rows store the same values as the first 8 rows of ROM 170, from which M has been subtracted. Row 0 stores 0, row 1 stores $w_4$% M, row 2 stores $w_5$% M, row 3 stores $(w_5+w_4)$ % M, row 4 stores $w_6$% M, row 5 stores $(w_6+W_4)$ % M, row 6 stores $(w_6+w_5)$ % M, row 7 stores $(w+w_5+w_4)$ % M, row 8 stores –M, row 9 stores ($w_4$% M)–M, row 10 stores ($w_5$% M)–M, row 11 stores (($w_5+w_4$) % M)–M, row 12 stores ($w_5$% M)–M, row 13 stores (($w_6+w_4$) % M)–M, row 14 stores (($w_6+w_5$) % M)–M, and row 15 stores (($w_6+w_5+w_4$) % M)–M. ROM outputs 171 and 177 are added to a multiplexer's output using two 25-bit carry-save adders 178 and 179, the sum and carry being stored in a register 180. The LSB of all seven residues address the 128-bit-by-1 ROM 172; ROM 172's bit ($a_6$ $a_5$ $a_4$ $a_3$ $a_2$ $a_1$ $a_0$) will be written with a 1 if the top ROM's ($a_3$ $a_2$ $a_1$ $a_0$) output 171, and the bottom ROMIs (0$a_6$ $a_5$ $a_4$) output 177 is such that their sum is greater than M, otherwise it will be a 0. If the output 173 of this ROM is 1, it selects the bottom rows of ROM 176 to output value of the top rows of ROM 176 minus M, to cause the adders to subtract M from the sum, so that the sum of the two ROM inputs to the adders is always less than M.

It is easy to verify at this point that if all higher order bits of the residues $u_1$, except the LSB of each, are zeros, but any of the LSB of each may be non-zero, then the two carry save adders are able to put $\Sigma^6_{i=0} (u_i \cdot w_i)$ into the register. This operation is executed in four steps for each bit of the residues, but in each step except the first, the register output, shifted left one place, is added to ROM outputs 171 and 177. Note that the most significant bit of each residue is applied first, and is doubled three times as it passes out of the register, so its contribution to the final result is multiplied by its weight, 8. The contributions of each bit of the residue bits are likewise multiplied by their weights and summed into the result. Therefore the two carry save adders are able to put:

$$(\Sigma^6_{i=0} (u_i \cdot w_i))+(k \cdot M), \text{ for some k,} \qquad (2)$$

into the register, as long as the residues have a zero in bit position 4. Note that each step can add a value less than M to twice the previous value, so after four steps the register has value less than 16 . M. That is, in the above formula, $k<16$.

For the selected modulus, there are two residues $u_6$ and $u_5$ that have five bits of precision. Rather than utilize an extra step to take care of this fifth bit, the first step can be modified to handle all forth-bit and fifth-bit inputs simultaneously. In the first step, using multiplexer 181, another ROM 183's output 182, shown on the bottom right is inputted into the first adder in lieu of the register 180, and ROM 174's output 175 selects its top four or bottom four rows to subtract M if the sum of values on lines 171, 177, and 182 would be larger than the product of the moduli M (after correction by ROM 172). As bit 3 of each residue is applied to the ROMs on the left, bits 4 of $u_6$ and $u_5$, denoted $b_6$ and $b_5$, are simultaneously applied to the ROM outputting 182. At address (0, $b_6$, $b_5$)=0 it stores 0, at 1 it stores $((2 \cdot w_5) \% M)$, at 2 it stores $((2 \cdot w_6) \% M)$, and at 3 it stores $((2 \cdot (w_6+w_5)) \% M)$ at 4 it stores M, at 5 it stores $((2 \cdot W_5) \% M)$–M, at 6 it stores $((2 \cdot w_6) \% M)$–M, and at 7 it stores $((2 \cdot (w_6+W_5)) \% M)$–M. Bit 3 of all seven residues ($a_6$ $a_5$ $a_4$ $a_3$ $a_2$ $a_1$ $a_0$) and bit 4 ($b_6$ $b_5$) of residues $u_6$ and $u_5$ address the 512-bit ROM 174; ROM bit ($b_6$ $b_5$ $a_6$ $a_5$ $a_4$ $a_3$ $a_2$ $a_1$ $a_0$) will be written with a 1 if the sum of values on lines 171, 177, and 182 would be larger than the product of the moduli M (after correction by ROM 172), otherwise it is 0. Note that this puts the value of formula (2) into the register, for any residue number. Each step still can add only a value less than M to twice the previous value. After four steps the register's value is less than $(16 \cdot M)$. That is, in (2), $k<16$.

After four clock cycles 160's output 161, which is $U+(k \cdot M)$, for some $k<16$, is transferred to the second stage, a reducer 162. See FIG. 11. 162's input data 161 is fed by a multiplexer 189 as input 190 to subtracter 191. In subtracter 191, each bit of the number 8·M determines the sum and carry output function to one of 25 one-bit half-adder/subtracters, for inputs a and b. For each stage the input a is the input's sum bit. For the least significant bit position, the input carry b is 1; for all other bit positions, it is the next lesser significant input carry. If a bit of 8·M is 1, then the sum output is (in C notation) a˜b and carry output is a & b (a half-adder), and if the bit is 0, then the sum output is (in C notation) (a˜b) and carry output is a|b (a half-subtracter). Output 192 is input 190 minus M. In the carry lookahead circuit in 193, only the carry out for the sign bit position is implemented, all other carry bits are not needed and their circuitry is omitted. A multiplexer in 193 outputs 196 this difference 192 and stores it into a register 195 if it is positive, or else it outputs the subtracter 191's input 190 through 196 and stores it into a register 195. The register's output 194, shifted left one bit, is inputted through multiplexer 189 as 190. In three more clock cycles the data is subtracted, compared, selected by the multiplexer, shifted, and inputted again, so as to effectively compare 4·M, 2·M, and M, and select the difference if it is not negative. Thus for the largest value $k<16$ leaving a positive number, $k \cdot M$ is subtracted from the number. After the fourth clock cycle, discarding the four low-order bits which are zeros, the result 196 is clocked into the register 197 and inputted as 163 to the third stage, a minimum circuit 164. See FIG. 12. Here, in the first step, positioning multiplexers 202 and 206 towards the center, the carry-save sum and carry values 163 are added in a 25-bit carry lookahead adder 204 and put in register 205. Then in a second step, positioning multiplexers 202 and 206 away from the center, this sum in 205 is subtracted from the previous minimum in 203; if the difference is positive, 205 is loaded as the new minimum in register 203 and a counter value 200, representing its motion vector, is loaded into register 201.

There are many residue-to-binary converter variations. For instance, the 512-bit overflow ROM 183 producing signal 182 can be removed and the bottom four rows of the ROM producing 182 can be eliminated, producing a number $(\Sigma_{i=0}^{6}(u_i \cdot w_i)) + (k \cdot M)$, for some k<32. (Such a result will require enlarging the registers by two bits.) This can be reduced by subtracting 16·M rather than 8·M in the reducer, but the last reduction step can be done in the lookahead adder so that the reduction stage and accumulator stage still both take 4 cycles.

Timing satisfies MPEG-1's requirements. The 4 nsec. SRAMs supply data to the sum squared error circuit and it is clocked every 8 nsec. To achieve this speed this SRAM can be multibanked; even columns can be in one bank while odd columns are in another bank. This circuit outputs a sum squared error every 64 nsec. The residue-to-binary converter and minimum circuit computes a motion compensation vector every 16.38 μsec. so MPEG-1 SIF-CPB's 1980 blocks are computed in 32.4 msec. The SRAMs are filled from DRAM at one byte per 85.3 nsec.

4. MPEG-2 Main Level Motion Compensation Vector Selection.

Figure 13:
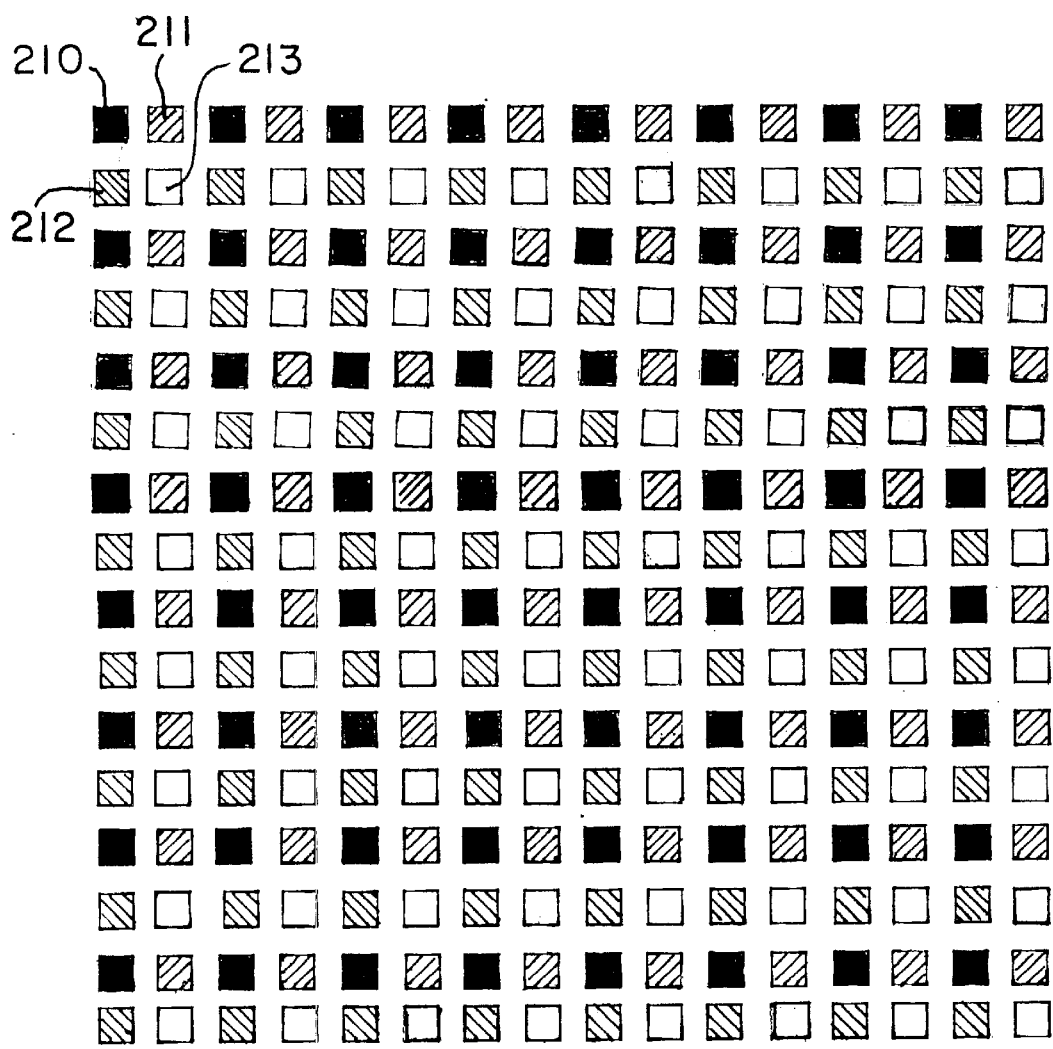
FIG. 13 is a description of a block of pixels for describing half-pixel motion vectors.

An MPEG-2 main level frame has 8100 blocks compared to an MPEG-1 frame's 1980 blocks, so for the same frame rate, an MPEG-2 motion compensation selector must calculate a motion compensation vector a little more than four times faster. (MPEG-2 also can compute motion compensation vectors on two previously sent frames rather than one, but discussion of that additional demand on motion compensation vector selection will be deferred until the end of this section.) But further, whereas MPEG-1 obtains one sum squared error for a test block, MPEG-2 interpolates test blocks at half pixel positions in vertical and in horizontal directions, and in both directions, from that one test block. It obtains four sum square errors between an input block and the four test blocks. FIG. 13 illustrates MPEG-2 blocks of pixels. Black squares such as 210 and each square two rows to the right or two rows below, for a total of 64 squares, represent a block of input video pixel values. Other squares such as 211, 212, and 213, represent pixels at half-pixel positions derived by interpolation. The 8 by 8 block of input pixels must be augmented by an extra row and column of pixels in order to obtain all interpolated values for each of the 8 by 8 blocks derived from it. A sum square error is obtained for the input test block indicated by black squares such as 210. The sum square error is also obtained for the same input block and a test block indicated by square 211, and each similarly shaded square two rows to the right or two rows below, for a total of 64 squares. The sum square error is obtained for the same input block and a test block indicated by square 212, and each similarly shaded square two rows to the right or two rows below, for a total of 64 squares. Finally, the sum square error is obtained for the same input block and a test block indicated by square 213, and each white square two rows to the right or two rows below, for a total of 64 squares. The desired motion compensation vector for this input block is that which produces the least sum square error of any of the four aforementioned cases. Four times as many sum square error calculations are required to select each motion compensation vector. In summary, since slightly over four times as many motion compensation vectors must be selected, and each requires four times as many sum square error calculations, an MPEG-2 main level motion compensation vector selector runs sixteen times faster, or sixteen copies of the previously described motion compensation vector selector run at the same speed.

Small fast ROMs will likely require more chip area per bit than high-density ROMs. A plot of chip area against access time should resemble an hyperbola, with a knee-point access time $A_k$. If the sum squared error circuit requires access times $<A_k$ then large areas will be needed, but if the sum squared error circuit requires access times $>A_k$ then not much area will be saved. The access time should be selected $\approx A_k$, then parallelism can be used to achieve the required throughput. $A_k$ is probably in the neighborhood of 3 nsec., depending on the technology.

Figure 14:
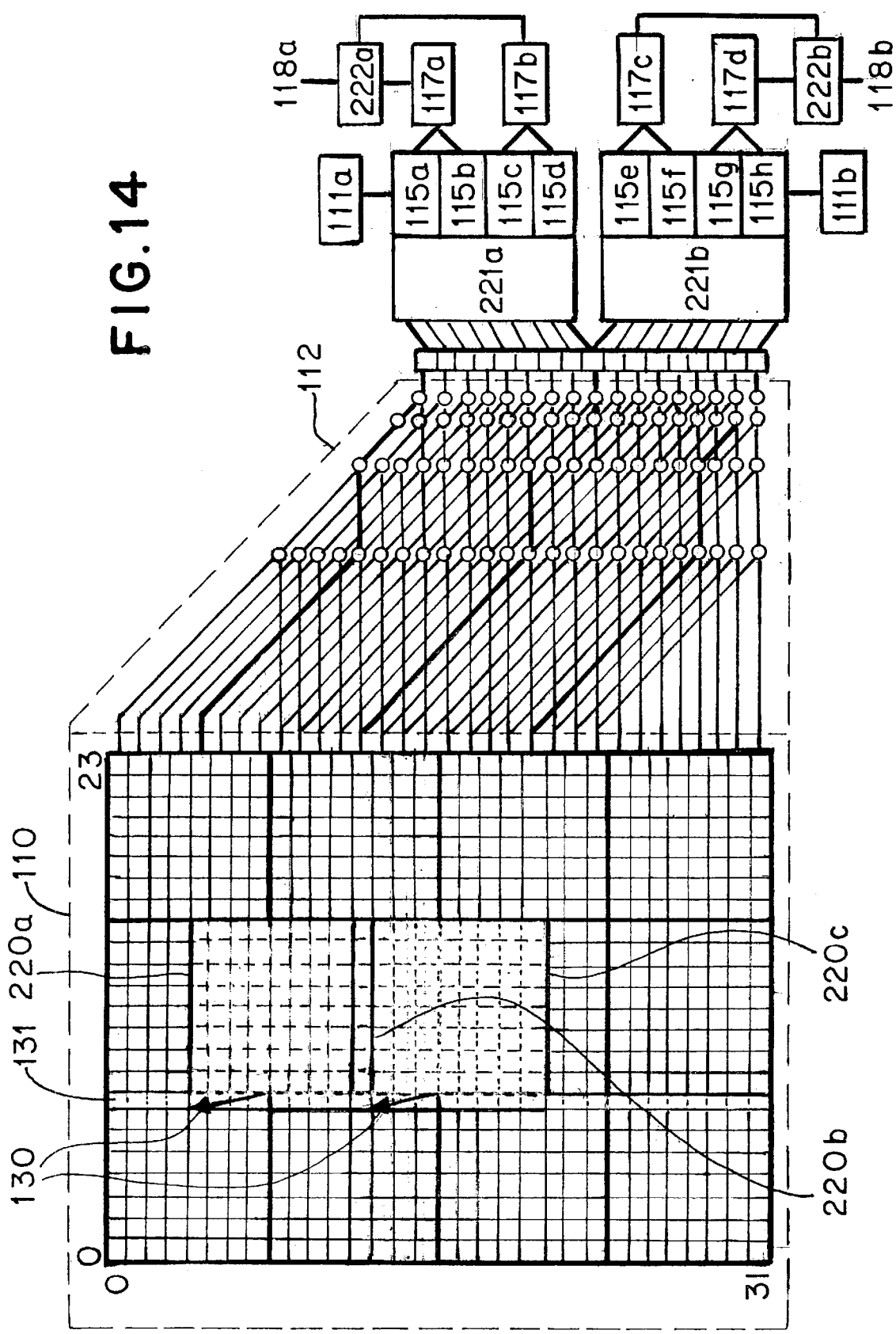
FIG. 14 is a block diagram showing the SRAM, barrel switch, interpolator, sum square error circuit, and motion compensation vector selector for MPEG-2 main level encoding.

A preferred embodiment of a main level MPEG-2 motion compensation vector selector will use 3.5 nsec. ROMs (see FIG. 14). A subsystem will be assumed to be twice as fast as the previously described system, so two copies of this subsystem will be incorporated. If rows of blocks are numbered from 0 on the top, down the screen, then the motion compensation vector for input blocks in even numbered rows will be determined by one subsystem while the motion compensation vector for input blocks in odd numbered rows will be simultaneously determined by the other subsystem. As in the previously described sum square error circuit, input blocks will be processed from left to right in a row, and then rows will be processed in pairs from top to bottom. SRAMs 111a and 111b have the same size and function as SRAM 111 has for the previously described circuit, and feed the same inputs 113a, 113b, . . . , 113h of each sum square error circuit to which it is coupled (see FIG. 6). The first subsystem will compute a sum square error for a input block from an even row, which is stored in an SRAM 111a, relative to a test block obtained from SRAM 110. The second subsystem will simultaneously compute a sum square error for the input block from an odd row immediately and directly below on the screen the aforementioned input block. This input block is stored in SRAM 111b. This sum squared error is computed relative to a test block read from SRAM 110 having the same motion compensation vector, immediately and directly below the aforementioned test block. SRAM 110 and barrel switch 112 have eight additional rows more than needed for the MPEG-1 application, to hold all the data needed to compute the result. The first subsystem coupled to SRAM 111a comprises interpolation circuit 221a, sum square error circuits 115a, 115b, 115c, and 115d, converter/minimum circuits 117a and 117b, and minimum circuit 222a. The second subsystem comprises corresponding circuits 221b, 115e, 115f, 115g, 115h, 117c, 117d and 222b. SRAM 111a feeds 115a, 115b, 115c, and 115d, and SRAM 111b feeds 115e, 115f, 115g, and 115h. Enlarged SRAM 110 and enlarged barrel switch 112 feed both subsystems simultaneously.

Recall that a 9 by 9 array of pixels must be inputted to each interpolator. As in the previously described sum square error circuit, SRAM 110 is addressed to read one column of 32 pixel values, such as column 131, and barrel switch 112 routes the elements in SRAM rows to interpolator inputs. Column elements within rectangle 220a are routed to interpolator 221a, the element within rectangle 220b is routed to both interpolators 221a and 221b, and elements within rectangle 220c are routed to 221b. Note that the bottom input byte of 221a is identical to the top input byte of 221b. Nine consecutively addressed columns are sequentially read from SRAM 110 to interpolators 221a and 221b using the same barrel switch 112 control settings.

Figure 15:
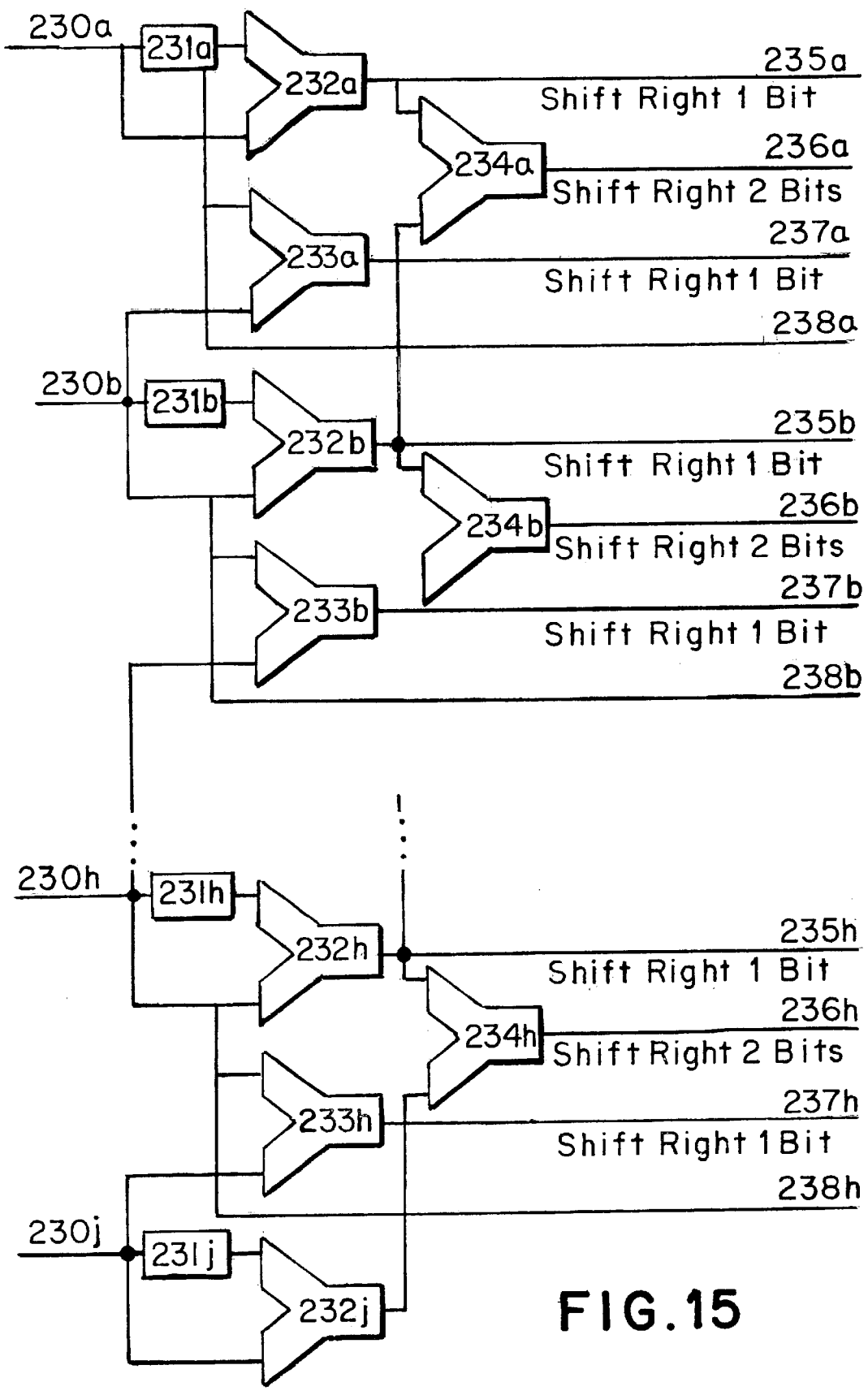
FIG. 15 is a block diagram showing an interpolator for FIG. 14.

FIG. 15 shows the interpolator of either subsystem. For first subsystem's interpolator 221a, eight pixel interpolation circuits' components are denoted by numbers with suffix letters a to h, and a ninth circuits components are denoted by subscript j, used only to calculate interpolated pixel values on the bottom of the block. Each byte outputted from barrel switch 112 is inputted as 230a, 230b, ..., 230h, and 230j.

The first eight of these pixel values, 230a, 230b, ..., 230h, are directly outputted from the interpolator as 238a, 238b, ..., 238h. They correspond to black squares such as 210 in FIG. 13. These interpolator outputs are coupled to inputs 114a, 114b, ..., 114h of a first sum square error circuit 115a (see FIG. 6); its output 116 is the sum square error between the input block and this test block comprising pixels represented by said black squares.

Pipeline registers 231a, 231b, ..., 231h, 231j hold the values of barrel switch outputs used in the previous clock step. Eight-bit binary adders 232a, 232b, ..., 232h and 232j derive the sum of present and previous barrel switch output values. Their outputs are shifted right one bit to obtain interpolator outputs 235a, 235b, ..., 235h. These output pixel values correspond to diagonally lined squares such as 211 in FIG. 13. These outputs are coupled to inputs 114a, 114b, ..., 114h of a second sum square error circuit 115b whose output 116 is the sum square error between the input block and the test block comprising pixels represented by said diagonally lined squares.

Eight-bit binary adders 233a, 233b, ..., 233h derive the sum of present barrel switch outputs of a row and of the next lower row. Their outputs are shifted right one bit to obtain interpolator outputs 237a, 237b, ..., 237h. They correspond to diagonally lined squares such as 212 in FIG. 13. These outputs are coupled to inputs 114a, 114b, ..., 114h of a third sum square error circuit 115c whose output 116 is the square error between the input block and the test block comprising said diagonally lined squares.

Eight-bit binary adders 234a, 234b, ..., 234h derive the sum of both the present and immediate past barrel switch outputs of a row and of the row immediately below that row. Their outputs are shifted right two bits to obtain interpolator outputs 236a, 236b, ..., 236h. These outputs correspond to white squares such as 213 in FIG. 13. These outputs are coupled to inputs 114a, 114b, ..., 114h of a fourth sum square error circuit 115d whose output 116 is the square error between the input block and the test block comprising said white squares.

In a cycle of nine clock steps, the sum squared error circuit computes the four error values as follows. In the first eight clock steps, sum square error circuits 115a and 115c are clocked. In the last eight clock steps 115b and 115d are clocked. AND gates 144 in each sum square error circuit cause the first column's sum square error to be loaded, and the others to be added into 143.

Each sum square error 116 from 115a, 115b, 115c and 115d is converted to binary and a minimum is obtained as follows. As in the simple least squared error circuit described earlier, a carry and save formatted minimum is obtained in 256 successive sequences in each circuit 115a, 115b, 115c and 115d for 256 test motion compensation vectors. Converter/minimum circuit 117a obtains the binary number minimum square error and its motion compensation vector for sum square error circuits 115a and 115b. Converter/minimum circuit 117b similarly obtains them for 115c and 115d. The binary number minimum of each of 117a and 117b is obtained in 222a and the corresponding motion compensation vector for this minimum is outputted as 118a. It is the motion compensation vector for the input block presently in 111a. Similarly, output 118b is the motion compensation vector for the input block presently in 111b.

The complete system timing suits MPEG-2's requirements using a 3.5 nsec. clock. Every 3.5 nsec., the 1.75 nsec. (multibanked) SRAMs supply a column of data and the sum squared error circuits is clocked. It outputs four sum squared errors after 9 clock cycles, every 31.5 nsec. The minimum circuit obtains a motion compensation vector every 8 µsec. However, two motion compensation vectors are simultaneously produced, so MPEG-2's main level 8100 blocks are computed in 32.4 msec. The SRAM is filled from synchronous DRAM at one byte per 31 nsec.

Each sum square error circuit has about 130 K bits of ROM. Eight such circuits illustrated in FIG. 14 have about 1 Mbit of ROM. Two such circuits are used to determine a motion compensation vector for two previously sent frames. The inventive motion compensation vector selection system disclosed here for MPEG-2 main level encoding can be implemented on a single chip having only 2 Mbit bits of 3.5 nsec. ROM and some support logic.

Requiring only a few megabits of ROM and a few K bits of SRAM, this basic circuit, could handle up to MPEG-2 high level used in HDTV. Further, being ROM-based, it can be implemented in chips with DRAM holding the video data, without much effort.

Note that in this preferred embodiment and similar cases, circuitry can be shared. A given input block from SRAM 111a can be simultaneously compared to four test blocks derived by means of interpolator 221a. The test block immediately below the aforementioned test block on the screen can be simultaneously inputted for comparison to the input block in SRAM 111b, and at each step the same motion compensation vector's test block relative to it can be accessed, to share SRAM and barrel switch 112 hardware. Only four, and not six, input blocks must be in SRAM to simultaneously obtain two test blocks having the same motion compensation vector. Only the bottom eight rows of SRAM and barrel switch are replicated to obtain the extra input block. Also, a single residue-to-binary converter and minimum circuit 117 is shared among two sum squared error circuits 115, because for the same clock rate the residue-to-binary converter and minimum circuit 117 takes four steps, while the sum squared error circuit 115 take eight steps. Note that the computational load can be handled by using parallelism or by using faster ROMs.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A circuit that determines a sum squared error between a vector v and a vector u comprising:
   a) one or more binary-to-residue converter means, each having an input and an output;
   b) a residue-to-binary converter means having an input and an output;
   c) one or more residue number adder means having two inputs and an output wherein the outputs are the sums, represented in residue number format, of the two inputs, represented in residue number format; and d) one or more means having two inputs and an output, wherein the outputs, represented in residue number format, are the square of the difference between a variable applied on one input, which is represented in residue number format, with a variable applied on the other input, which may be represented in binary number format or in residue number format;

e) wherein binary number inputs are coupled to inputs to binary-to-residue converters, wherein binary-to-residue converter outputs are coupled to part d means inputs, wherein adder inputs are coupled to part d means outputs or adder outputs, and wherein one adder output is coupled to a residue-to-binary converter, such that the latter's binary number output is the sum squared error of the vector v and the vector u applied to inputs to part d means.

2. A circuit of claim 1 in which memory means are placed in any or all of the couplings between the binary-to-residue converter means, residue-to-binary converter means, multiplier means, and adder means to hold the data being transferred through these couplings.

3. A circuit of claim 2 in which the moduli are 5, 7, 9, 11, 16, 17, and 19.

4. A circuit that selects the motion compensation vector for an integrated circuit for performing video encoding comprising:

a) one or more binary-to-residue converter means, each having an input and an output;

b) a residue-to-binary converter means having an input and an output;

c) one or more residue number adder means having two inputs and an output wherein the outputs are the sums, represented in residue number format, of the two inputs, represented in residue number format; and d) one or more means having two inputs and an output, wherein the outputs, represented in residue number format, are the square of the difference between a variable applied on one input, which is represented in residue number format, with a variable applied on the other input, which may be represented in binary number format or in residue number format;

e) wherein binary number inputs are coupled to inputs to binary-to-residue converters, wherein binary-to-residue converter outputs are coupled to part d means inputs, wherein adder inputs are coupled to part d means outputs or adder outputs, and wherein one adder output is coupled to a residue-to-binary converter, such that the latter's binary number output is the sum squared error of an array of pixel data and another array of pixel data applied to inputs to part d means;

f) minimum circuit means having an input coupled through residue-to-binary converter means to sum squared error circuit means, to determine which sum squared error input is minimum, in which the output provides an indication of the derived motion compensation vector associated with the reference block having this minimum sum squared error.

5. A circuit of claim 4 in which memory means are placed in any or all of the couplings between the binary-to-residue converter means, residue-to-binary converter means, multiplier means, adder means, and minimum circuit means, to hold the data being transferred through these couplings.

6. A circuit of claim 4 in which the moduli are 5, 7, 9, 11, 16, 17, and 19.

7. A residue-to-binary converter consisting of a ROM, adder, and register, in which the Read Only Memory (ROM) stores all combinations of residue weights for a set of residues, in which the residue values are applied bit serially, as the register value is shifted and added to the ROM outputs, in the manner of distributed arithmetic, and the output of which is reduced by subtracting powers of the product of the moduli, M, as long as the difference is positive, to obtain the binary number.

8. A residue-to-binary converter of claim 7 in which addition is performed using carry-save arithmetic circuits, and the carry and sum outputs are added using a conventional binary adder.

9. A residue-to-binary converter of claim 7 in which a conventional binary adder compares the converter output to a previously calculated output, retaining the output if it is a minimum, and retaining an indication of which step among a plurality of steps contributing converter outputs, produced said minimum converter output.

10. A circuit of claim 7 in which the moduli are 5, 7, 16, 17, and 19.

11. A method of converting a value from residue number format to binary number format comprising:

(a) applying residues bit serially to a RAC comprising one or more Read Only Memorys (ROMs), an adder, and an accumulator, and accumulating a binary number which is shifted and added to the Read Only Memory (ROM) outputs to derive the binary number format but with multiples of the product of the moduli added to it; and (b) applying reduction that subtracts powers of two times the product of the moduli, from a large value applied first to the product of the moduli applied last, taking the difference as long as the difference remains positive.

12. The method of claim 11, which uses carry-save arithmetic to compute a sum and carry binary number format, followed by conversion from sum and carry format to conventional binary number format.

13. The method of claim 11, in which the moduli are 5, 7, 9, 11, 16, 17, and 19.

14. A Read Only Memory Accumulator (RAC) which computes the inner product of a vector of variables and an equal dimensioned vector of constants utilizing distributed arithmetic, utilizing carry save adders within the RAC and binary adders coupled to outputs of such Read Only Memory Accumulators (RACs) such that carry save addition and/or subtraction is used to accumulate the inner product, and the binary adder is used to convert the carry and sum data to conventional binary data.

* * * * *